US009470324B2

(12) United States Patent
Landrum

(10) Patent No.: US 9,470,324 B2
(45) Date of Patent: Oct. 18, 2016

(54) DIRECTIONAL VALVE AND METHOD OF OPERATION

(71) Applicant: SPX Corporation, Charlotte, NC (US)

(72) Inventor: Michael T. Landrum, Rockford, IL (US)

(73) Assignee: SPX FLOW, INC., Charlotte, NC (US)

( * ) Notice: Subject to any disclaimer, the term of this patent is extended or adjusted under 35 U.S.C. 154(b) by 524 days.

(21) Appl. No.: 13/909,755

(22) Filed: Jun. 4, 2013

(65) Prior Publication Data

US 2014/0352828 A1    Dec. 4, 2014

(51) Int. Cl.
*F16K 11/02* (2006.01)
*F16K 11/07* (2006.01)
*F16K 11/044* (2006.01)

(52) U.S. Cl.
CPC .......... *F16K 11/0708* (2013.01); *F16K 11/044* (2013.01); *Y10T 137/8663* (2015.04); *Y10T 137/86879* (2015.04); *Y10T 137/86887* (2015.04)

(58) Field of Classification Search
CPC ............... Y10T 137/87885; Y10T 137/8663; Y10T 137/86686; Y10T 137/86887; Y10T 137/87225; Y10T 137/86879; Y10T 29/49995; Y10T 29/49412; Y10T 29/49417; Y10T 29/49876; F15B 13/00; F15B 13/04; F16K 11/0708; F16K 11/044; F16K 11/07; F16K 27/041; Y10S 425/058
USPC ............ 137/625.66, 625.27, 625.49, 596.18, 137/884, 625.48
See application file for complete search history.

(56) References Cited

U.S. PATENT DOCUMENTS

| | | | | | |
|---|---|---|---|---|---|
| 2,658,523 | A | * | 11/1953 | Johnson | F15B 13/02 137/625.27 |
| 3,191,626 | A | * | 6/1965 | Leibfritz | 137/625.69 |
| 3,244,193 | A | * | 4/1966 | Loveless | 137/454.6 |
| 3,530,897 | A | * | 9/1970 | Buchanan | 137/625.25 |
| 3,587,156 | A | * | 6/1971 | Sorenson | 137/625.48 |
| 3,590,874 | A | * | 7/1971 | Rice | 137/625.48 |
| 3,680,596 | A | * | 8/1972 | Pickett | 137/625.69 |
| 3,706,322 | A | * | 12/1972 | Carlson | 137/625.66 |
| 3,902,526 | A | * | 9/1975 | Brake et al. | 137/625.64 |
| 4,067,357 | A | * | 1/1978 | Ruchser | 137/596.18 |
| 4,145,957 | A | * | 3/1979 | McClocklin | 137/596.14 |

(Continued)

FOREIGN PATENT DOCUMENTS

| | | |
|---|---|---|
| DE | 1775752 A1 | 4/1972 |
| DE | 10 2008 001 955 A1 | 12/2009 |
| FR | 1517986 A | 3/1968 |

OTHER PUBLICATIONS

Search Report from European Application No. EP14171137.

*Primary Examiner* — Craig J Price
(74) *Attorney, Agent, or Firm* — Baker & Hostetler LLP

(57) ABSTRACT

A valve is provided. The valve may include: an axially movable spool having a conical valve portion and dissipating disk portion; a valve housing defining a valve cavity in which the spool resides; a first port in the valve housing; a second port in the valve housing; a land defined by the housing; a wide portion in the housing; and a valve seat defined, at least in part, by the valve housing configured to form a seal with the conical valve portion, wherein the land, the wide portion, the conical valve portion, and the valve seat are dimensioned to cause the disk portion and the land to be proximate to each other when the valve section is near the valve seat and the disk portion is proximate to the wide portion when the valve section is away from the valve seat.

13 Claims, 7 Drawing Sheets

(56) References Cited

U.S. PATENT DOCUMENTS

| | | | |
|---|---|---|---|
| 4,240,467 A * | 12/1980 | Blatt et al. | 137/625.66 |
| 5,676,169 A | 10/1997 | Landrum | |
| 2003/0150498 A1 * | 8/2003 | Williams | 137/625.65 |
| 2005/0224119 A1 * | 10/2005 | Okamoto | 137/625.69 |

* cited by examiner

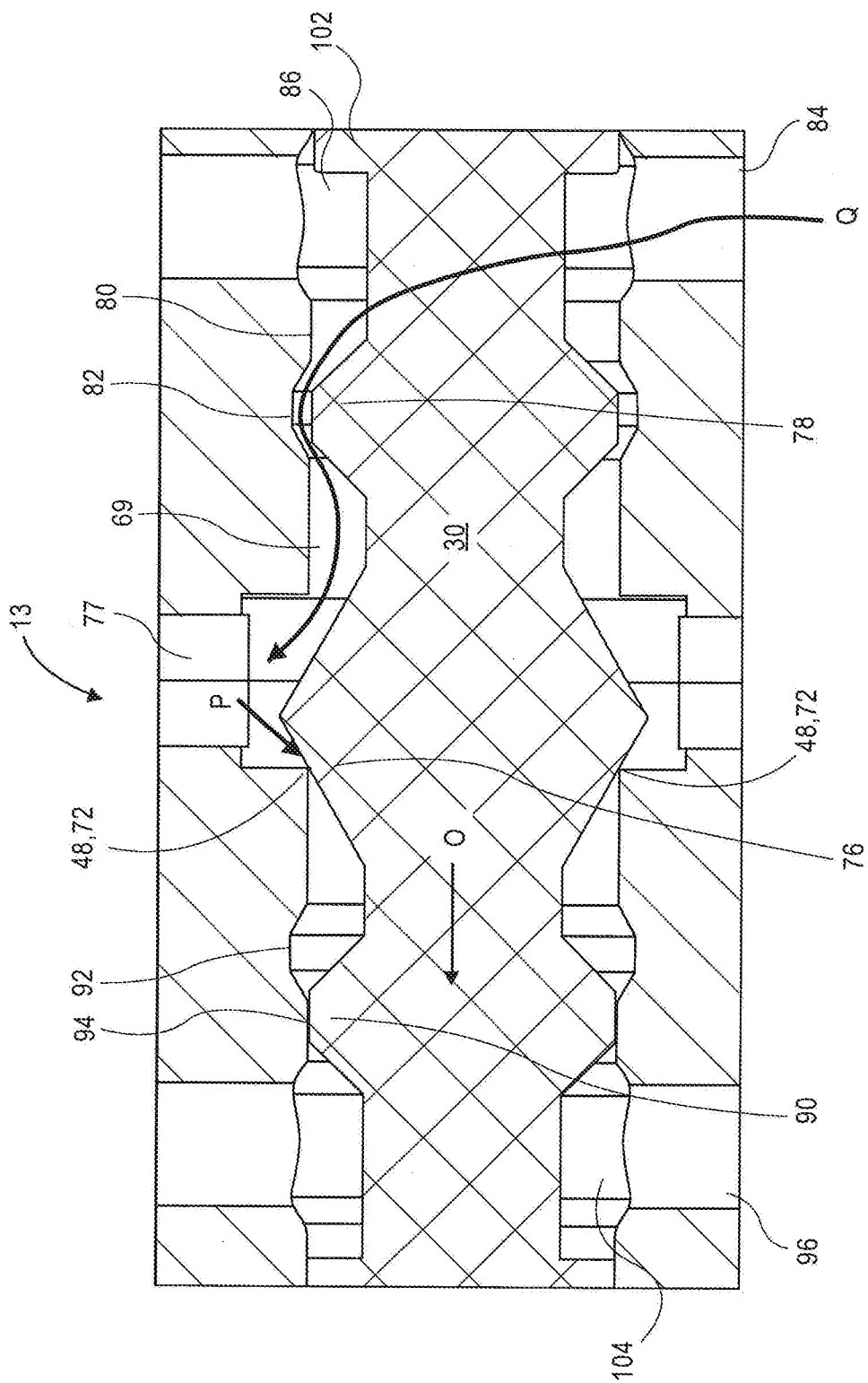

DIRECTIONAL VALVE AND METHOD OF OPERATION

FIELD OF THE INVENTION

This disclosure is directed to hydraulic valves. More particularly, it is directed to a double actuating spool valve and a system and method for actuating the valves.

BACKGROUND OF THE INVENTION

Hydraulic systems often use hydraulic valves in order to control the hydraulic system. One common type of valve is a spool poppet directional valve. Hydraulic systems may have hydraulic fluid being moved at high velocity. This high velocity fluid can create problems such as erosion within the hydraulic system. For example, high velocity fluid contains a lot of energy when a poppet valve is near or approaching its seat, the fluid is forced to slow down as it flows between the not yet seated poppet valve and its seat. This narrow gap while the valve is in the transition between being closed and open may be subject to wear and or erosion resulting from the energy dissipation of the hydraulic fluid. This erosion may, in some instances, leads to valve failure and/or leakage.

Furthermore, the hydraulic spool valves need to be actuated in order to move between an open and close position. Often the actuators move the spool axially between open and closed positions. In order to gain efficiency and reduce costs, is desirable to find ways to actuate the valves with minimal expenditures of energy.

Accordingly, it is desirable to provide an apparatus and method that allows the energy of high velocity hydraulic fluid to be dissipated without causing undue wear or erosion of valve sealing components. Further, it may be desirable to create an apparatus or method that can easily actuate hydraulic valves using reduced amounts of energy.

SUMMARY OF THE INVENTION

The foregoing needs are met, to a great extent, by the present invention, wherein in one aspect an apparatus is provided that in some embodiments an apparatus and method may be provided that allows the energy of high velocity hydraulic fluid to be dissipated without causing undue wear or erosion of valve sealing components. Further, an apparatus or method may be provided that can easily actuate hydraulic valves using reduced amounts of energy.

In accordance with one embodiment of the present invention, a valve is provided. The valve includes: an axially movable spool having a conical valve portion and dissipating disk portion; a valve housing defining a valve cavity in which the spool resides; a first port in the valve housing configured to provide fluid communication from outside the valve housing to the valve cavity; a second port in the valve housing configured to provide fluid communication from outside the valve housing to the valve cavity; a land defined by the housing to provide a small tolerance between the land and the disk portion when the spool is in a position to cause the disk portion to be proximate to the land; a wide portion in the housing to provide a large tolerance between the land and the disk portion when the spool is in a position to cause the disk portion to be proximate to the wide portion; and, a valve seat defined, at least in part, by the valve housing configured to form a seal with the conical valve portion when the spool is in a position to cause the conical valve portion to be pressed against the valve seat and the disk portion, the land, the wide portion, the conical valve portion, and the valve seat are dimensioned to cause the disk portion and the land to be proximate to each other when the valve section is near the valve seat and the disk portion is proximate to the wide portion when the valve section is away from the valve seat.

In accordance with another embodiment of the present invention, a method of reducing erosion within the valve assembly is provided. The method may include: configuring a valve to restrict fluid flow through the valve at a place in the valve away from the valve seat when a conical valve portion is proximate to a valve seat; and configuring the valve to open flow through the valve when the conical valve portion is not proximate to the valve seat.

In accordance with yet another embodiment of the present invention, a valve may be provided. The valve may include: an axially movable valving means having a conical valve portion and dissipating disk portion; a means for housing defining a valve cavity in which the valving means resides; a first port in the housing means configured to provide fluid communication from outside the housing means to the valve cavity; a second port in the housing means configured to provide fluid communication from outside the housing means to the valve cavity; a means for constricting defined by the housing means to provide a small tolerance between the means for constricting and the disk portion when the valving means is in a position to cause the disk portion to be proximate to the means for constricting; a wide portion in the housing to provide a large tolerance between the means for constricting and the disk portion when the valving means is in a position to cause the disk portion to be proximate to the wide portion; and a valve seat defined, at least in part, by the means for housing configured to form a seal with the conical valve portion when the valving means is in a position to cause the conical valve portion to be pressed against the valve seat and the disk portion, the means for constricting, the wide portion, the conical valve portion, and the valve seat are dimensioned to cause the disk portion and the means for constricting to be proximate to each other when the valve section is near the valve seat and the disk portion is proximate to the wide portion when the valve section is away from the valve seat.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 7 a partial cross-sectional view of one of the valves in the system with the spool in a particular position.

DETAILED DESCRIPTION

Figure 1:
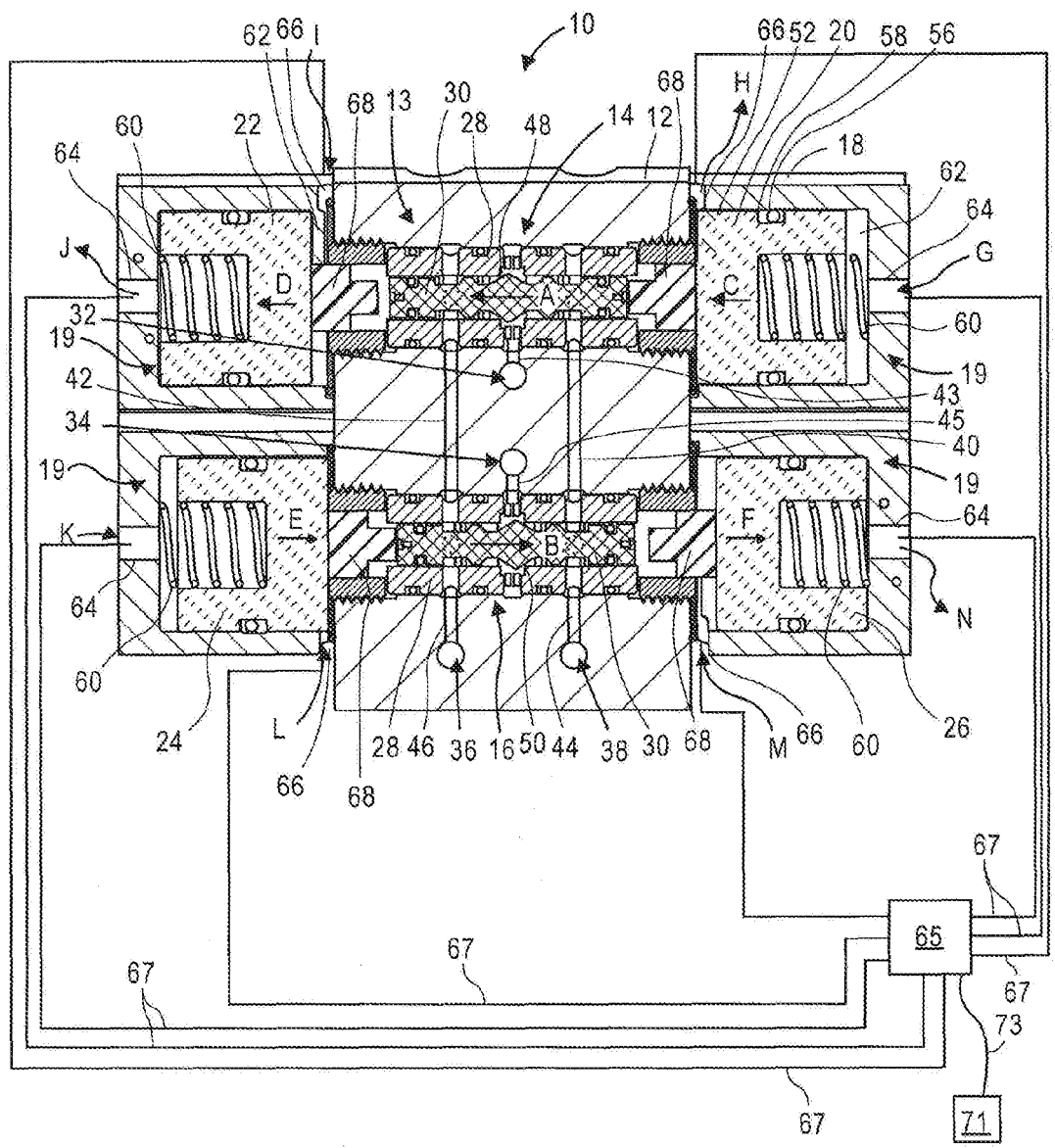
FIG. 1 is a cross-sectional view of a valve system in accordance with the disclosure.

The invention will now be described with reference to the drawing figures, in which like reference numerals refer to like parts throughout. An embodiment in accordance with the present invention provides a system and method that includes at least one directional valve and multiple stage sealing methods. For example, a valve block may contain multiple valves. The valve block may be part of a hydraulic system. The various valves within the valve block may be selectively in fluid communication with each other.

Hydraulic fluid that flows through the valve block may, at certain times, be traveling at relatively high velocity. When various valves within the system close the high velocity fluid is suddenly stopped. The energy contained by the high velocity fluid may be dissipated using various means such as heat. However, when the valve is in a transitional state (i.e., between not fully seated and not fully opened) high velocity fluid may erode the valve or the valve seat. The more velocity of the fluid can be reduced before contacting the valve seat, the more energy will be dissipated before the fluid contacts the valve or the valve seat.

Certain embodiments described herein described causing high velocity fluid to flow through a restricted space before contacting the valve and valve seat thereby dissipating the fluid's velocity and energy before ever contacting the valve or a valve seat.

Furthermore, a system for moving the valve spool using a combination of pneumatic pressure and spring force is described.

Figure 2:
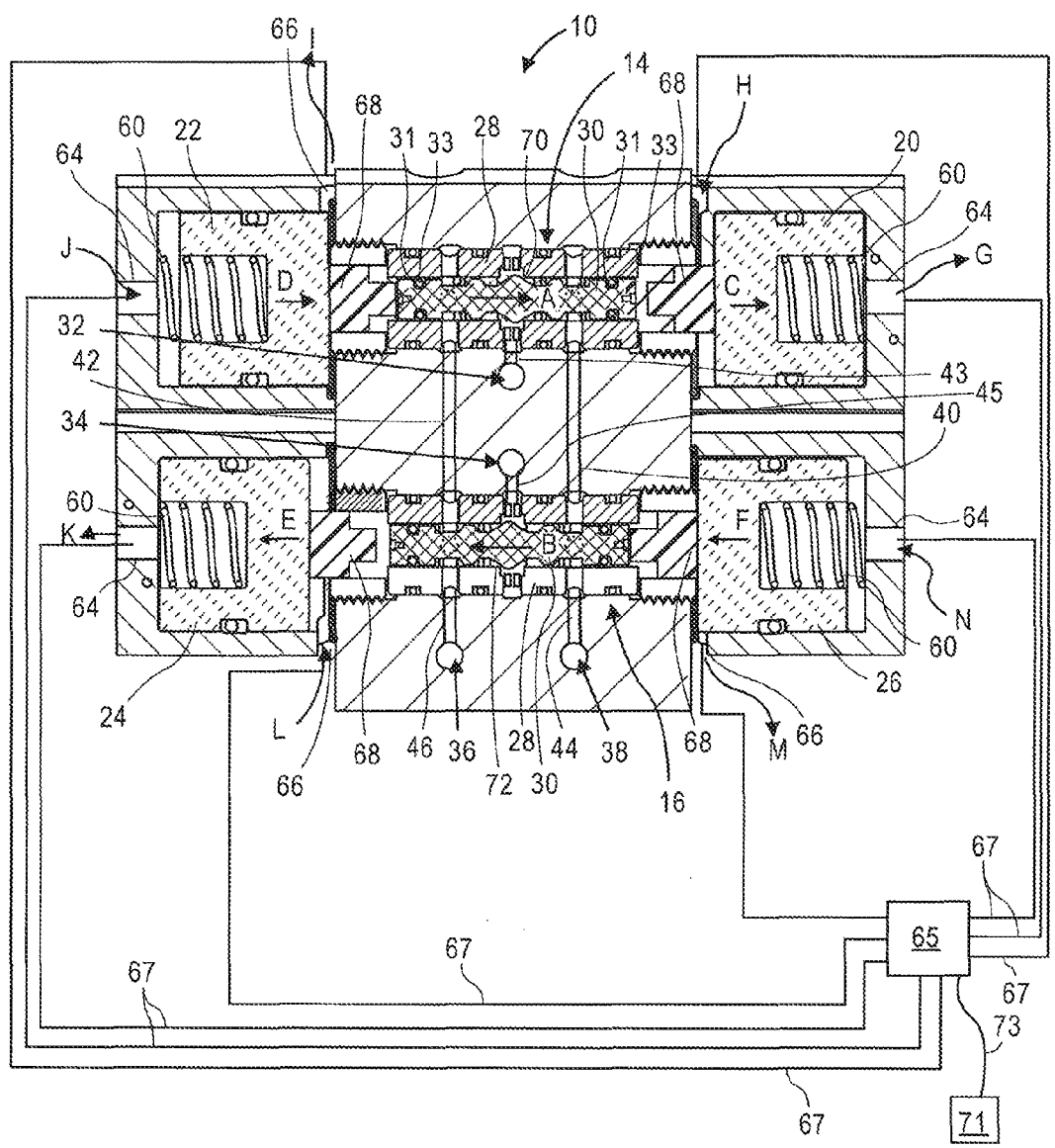
FIG. 2 is a cross-sectional view of the valve system where the spools are in a different position than the positions shown in FIG. 1.

An embodiment of the present inventive apparatus is illustrated in FIGS. 1 and 2. FIGS. 1 and 2 describe a valve system 10. The valve system 10 may be part of a hydraulic circuit. The valve system 10 includes a valve block 12 which contains valves 13. The valve block 12 may contain any number of valves 13. However, as illustrated in FIGS. 1 and 2 the valve block 12 contains two valves 13, an upper valve 14 and a lower valve 16.

FIGS. 1 and 2 will now be described. The difference between FIGS. 1 and 2 is that the valves 14 and 16 are in different positions. This will be described in more detail later below. As shown in FIGS. 1 and 2, the valve block 12 has an actuator housing 18 attached to the valve block 12. The actuator housing 18 contains houses the actuators 19. The actuators 19 may include an upper right actuator 20, an upper left actuator 22, a lower left actuator 24, and a lower right actuator 26. (The positions are made with reference to positions shown in FIGS. 1 and 2 and are exemplary and therefore not limiting.)

One of ordinary skill the art after reviewing the disclosure will understand that each of valves 13 may be operatively connected to a left and right actuator 19. As result, valve blocks 12 having more or fewer valves 13 will also have more or fewer actuators 19 than described herein. However, more or fewer valves 13 and actuators 19 are contemplated by the invention and may be present or absent in embodiments in accordance with the claims.

The valves 13 contained within the valve block 12 include a valve housing 28. In some embodiments, the valve housing 28 may be made of steel however, other materials or alloys may also be used. A spool 30 is contained within the valve housing 28. The spool 30 is configured to move axially within the valve housing 28 in order to be in various positions of open, closed, or in a transitional position between open and closed. The spool 30 may contain O-ring grooves 31 which, in turn, may contain O-rings 33 in order to seal or substantially seal the spool 30 with the valve housing 28. A more detailed description of the spool 30, the valve housing 28, and the various positions of open, closed, and transitional positions are given with more detail in reference to FIGS. 3 through 7 later below.

As shown in FIGS. 1 and 2, the valve block 12 may define ports 32, 34 through which hydraulic fluid may flow. Connecting lines 43 and 45 may provide fluid communication between the ports 32 and 34 through the valve block 12 and valve housing 28 to the spool 30. Other ports 36 and 38 may also provide fluid communication through the valve block 12. In some embodiments, port 36 is a pressure port which receives hydraulic fluid under pressure and port 38 is a tank port which allows hydraulic fluid to flow to a reservoir. Connecting lines 40, 42, 44, 43, 45, and 46, may provide fluid communication between the various ports 32, 34, 36, 38, the spools 30 of the valves 13. Other more, or fewer ports and connecting lines may also be used to achieve whatever circuit is desired.

FIGS. 1 and 2 also illustrate the valve seats 48 and 50 defined at least in part by the valve housing 28. In the valves 13 illustrated in the figures, the spool 30 can be moved to the left as shown by arrow A in FIG. 1. When the spool 30 is in this position, the spool 30 is resting against the valve seat 48. When the spool 30 moves in the direction as shown by arrow B illustrated by the lower valve 16 the spool 30 is resting against the other seat 50.

Movement of the spool 30 is accomplished by the actuators 20, 22, 24, and 26. In some embodiments, the actuators 20, 22, 24, 26 are pistons. The pistons 20, 22, 24, 26 may reside in cavities 62 in the actuator housing 18. The pistons 20, 22, 24, 26 are configured to move axially within the cavities 62 may be substantially sealed in the axial direction by O-rings 56 residing in O-ring grooves 58. Each piston 20, 22, 24, 26 may be biased toward the spool 30 via a spring 60.

The housing 18 in which each piston 20, 22, 24, 26 resides may be equipped with two pneumatic ports 64 and 66. One port is located on either end of the piston. With this configuration, the piston can be pushed in one axial direction or the other depending upon which port air is moved into the cavity 62.

An air source 65 is fluidly connected to each of the ports 64, 66 via a pneumatic connection 67. A controller 71 is connected to the air source 65 via a connector 73. The controller 71 causes the air source 65 to vent air into whichever respective port 64 or 66 and allow air to be vented out of the other respective port 64, 66 depending on which way it is desired to move the piston 20, 22, 24, 26. The pistons 20, 22, 24, 26 move the spool 30 axially via connectors 68.

For example, in order to move the spool 30 of the upper valve 14 and the lower valve 16 in the position shown in FIG. 1, air is directed from the air source 65 into the port 64 as shown by arrow G near the upper right piston 20. Air is pushed out of the port 66 as shown by arrow H. As the piston 20 moves in the direction indicated by arrow C. The spring 60 may also assist in moving the piston 20 in the direction indicated by arrow C. Such a movement causes the connector 68 to push the spool 30 of the upper valve 14 in the direction indicated by arrow A. In some embodiments, air is also vented into the port 66 near piston 22 as indicated by arrow I. By allowing air from the air source 65 to flow into port 66 as shown by arrow I, the force of the spring 60 associated with the upper left actuator 22 is overcome. The piston 22 moves in the direction indicated by arrow D. One advantage of embodiments that employ such a system is that the spring force of the spring 60 associated with piston 26 does not need to be overcome by the spring force associated with piston 22. Rather, the spring force of spring 60 associated with piston 28 is overcome solely by a pneumatic pressure provided from the air source 65 coming into port 66 as indicated by arrow I. As the piston 22 moves in the direction indicated by arrow D air is moved out of the cavity 62 through port 64 as indicated by arrow J.

As shown in FIG. 1, the lower valve 16 experiences a similar but opposite result than that described above with respect to the upper valve 14. Air from the air source 65 moves into port 66 associated with piston 26 as indicated by arrow M. This causes the piston 26 to move in the direction of indicated by arrow F and overcome the spring force associated with the spring 60 of piston 26. Air is forced out of the cavity 62 through port 64 as indicated by arrow N. At the same time, air may be supplied by the air supply 65 through the pneumatic connection 67 to port 64 associated with piston 24 as indicated by arrow K. The combined pneumatic force and the spring force from spring 60 associated with piston 24 acts upon piston 24 to move the piston 24, the connector 68, and the spool 30 in the direction indicated by arrows E and B thereby causing the spool 30 to move against the valve seat 50.

FIG. 2 illustrates the reverse positions shown in FIG. 1. For example, with respect to the upper valve 14, air has moved through port 64 against piston 22 as indicated by arrow J. The combined spring force from spring 60 and a pneumatic pressure from the air from the air source 65 coming through port 64 moves piston 22 the connector 68 and thus the spool 30 in the direction indicated by arrows D and A. Meanwhile, air is also moved through port 66 associated with the piston 20 thus moving the piston 20 in the direction indicated by arrow C. This pneumatic pressure has overcome the spring force associated with spring 60 associated with piston 20 and pushed air through port 64 as indicated by arrow G. In this manner, the spool 30 associated with the upper valve 14 has moved against the valve seat 70.

Meanwhile, the lower valve 16 has experienced a somewhat opposite effect. Air from the air source 65 has moved through the pneumatic connection 67 through port 64 associated with piston 26 as indicated by arrow N. The combined spring force of the spring 60 associated with piston 26 and the pneumatic pressure from the air flowing through port 64 has moved the piston 26, the connector 68 and the spool 30 in the direction indicated by arrows F and B. Thus, the spool 30 is pressed against the valve seat 72. The spring force associated with spring 60 associated with the piston 24 does not resist the movement of the piston 26 and the spool 30 from moving in the direction indicated by arrows F and B because air from the air source 65 enters to the port 66 as indicated by arrow L causing the piston 24 to move in the direction indicated by arrow E. The movement of the piston 24 in the direction of arrow E causes air with in the cavity 62 to be vented out of the port 64 as indicated by arrow K.

While the apparatus and method of operation described above contemplates pneumatic air pressure being applied to the pistons 20 and 22 or 24 and 26 at both ends of the spool 30, one of ordinary skill the art, after reviewing this disclosure, will understand that applying only air to one piston can also be used to move the spool 30. However, applying air to only one piston will result in additional air pressure needed in order to overcome the spring force associated with the spring being compressed when the opposite piston is moved away from the spool 30. For example, applying more air through port 64 as indicated by arrow N will cause the piston 26 to move in the direction of arrow F. This will cause the spool 30 to move in the direction of arrow B which will be resisted by the spring force of spring 60 associated with piston 24. However if sufficient air pressure is used and applied as indicated by the direction of arrow N the spring force of the spring 60 associated with piston 24 can be overcome causing the piston 24 to move in the direction of arrow E. This same principle can be applied to all the valves 13 and spools 30 to cause the spools 30 and pistons 20, 22, 24, 26 to move in either axial direction.

FIGS. 3 through 7 will describe the axial movement of the spool 30 within the valve housing 28 and how fluid flows through the valve 13 depending upon the position of the spool 30. The valve 13 illustrated and described with respect to FIGS. 3 through 7 is indicative of both the upper valve 14 and the lower valve 16 shown in FIGS. 1 and 2. The valves 14 and 16 are the same and may be referred to generically as valve 13. However, due to different ports being blocked or connected to flow paths they are not the same. The flow path as indicated by arrows Q and P are consistent with the lower valve 16. As indicated in FIGS. 1 and 2 the connecting lines 40 and 42 connects to the right port 88 and the left port 98. (see FIGS. 1, 2 and 3).

While these ports 88 and 98 are open to the connecting lines, 40 and 42, flow may or may not occur through them depending upon the position of the upper valve of the upper valve 14. In the case of the upper valve 14, the right port 88 and the left port 98 (shown in FIG. 3) are blocked by the valve block 12 as shown in FIGS. 1 and 2. However, with respect to the lower valve 16, flow could occur through ports 88 and 98 as well as ports 96 and 84 depending upon to position of the upper valve 14 because these ports are open to one of the connecting lines 40, 42 44, 46. Therefore, when flow is described as going through port 84 in the direction of arrow Q flow may occur through port 88 in addition to or instead of port 84 depending upon configuration of the valve system 10 and the position of the other valves 13 in the system. Similarly, when flow is described as going through port 96 as indicated by arrow P flow could also occur through port 98 in addition to 96 or instead of port 96 depending upon the configuration of the valve system 10 or the position of other valves 13 in the system 10.

Likewise, it should be understood that flow is described as flowing through top port 77 but that top port 77 is fluidly connected to bottom port 79. Therefore whether flow occurs through top port 77, is bottom port 79 or both depends upon the configuration of the valve system 10. For example, the top port 77 in the upper valve 14 is not connected to anything therefore no flow occurs through it. However the bottom port 79 is fluidly connected to the port 32 via the connecting line 43 therefore flow does occur through the bottom port 79. The opposite is true with respect to the lower valve 16 and the lower valve 16 flow occurs to the top port 77 as it is connected via a connecting line 45 to the port 34 however no flow occurs through the bottom port 79 of the lower valve 16 as the bottom port 79 is not connected to anything. Thus it should be clear that right ports 84 and 88 are fluidly connected to each other, top port 77 and bottom port 79 are fluidly connected to each other and left ports 98 and 96 are fluidly connected to each other and that flow occurs through these ports depending upon the position of other valves 13 in the system 10 and the configuration of the valve system 10. It should also be understood that other embodiments may configure connecting lines in other ways consistent with the claims.

Figure 3:
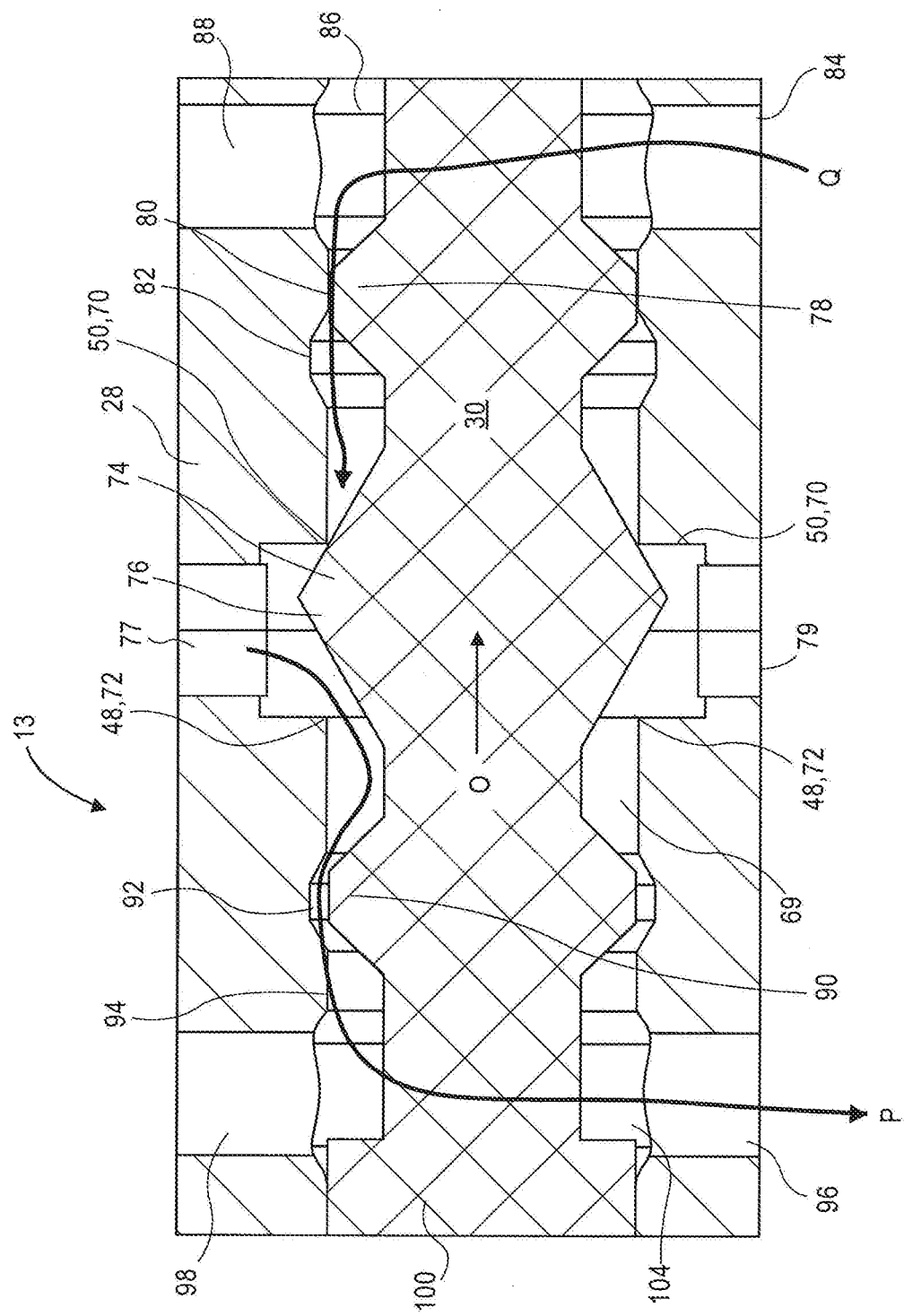
FIG. 3 is a partial cross-sectional view of one of the valves in the system with the spool in a particular position.

FIG. 3 is a partial cross-sectional view of a valve 13 in accordance with this disclosure. The valve 13 includes a spool 30 enclosed in a valve housing 28. The valve housing 28 includes right ports 84 and 88, top 77, bottom port 79, and left ports 96, 98 which provide fluid communication through the valve housing 28 into the cavity 69 in which the spool 30 resides. The cavity 69 is not a straight bore but rather has several features. For example the cavity 69 includes a right land 80 and left land 94. Adjacent to the right land 80 is a right port portion 86 and a right wide portion 82. Adjacent to the left land 94 is a left wide portion 92 and a left port portion 104.

The spool 30 also has various features. For example the spool 30 is equipped with a right dissipating disk portion 78 and a left dissipating disk portion 90. The spool 30 is also equipped with a left end portion 100 and a right end portion 102 (See FIG. 6). These left and 100 and right end portions 102 prevent fluid from flowing axially between the spool 30 and the valve housing 28 out of the valve 13. In some instances, as shown in FIGS. 1 and 2, the left 100 and right 102 end portions may be equipped with O-rings to help seal in hydraulic fluid.

The valve housing 28 may also define a left valve seat 48, 72 and a right valve seat 50, 70. The spool 30 may be equipped with a right valve section 74 and a left valve section 76. These may be conically shaped wide portions and the spool 30, when pushed against either the left valve seat 48, 72 or the right valve seat 50, 70 do not allow fluid to flow between the spool 30 and the valve seat 48, 50, 70, 72.

As shown in FIG. 3, the spool 30 has been moved in the direction of arrow O. The wider valve section 74 is pressed against the valve seat 50, 70. As result, fluid flowing through the port 84 in the direction of arrow Q is prevented from flowing further to the left and cannot get between the valve seat 50, 70 and the right valve section 74. Fluid flowing through the top port 77 does not flow between the right valve section 74 and the valve seat 50, 70 but rather flows along the spool 30 in the direction of arrow P. When the spool 30 is in the position shown in FIG. 3 the right dissipating disk portion 78 is in close proximity or is proximate to the right land 80. This creates a tight tolerance or a narrow space between the right dissipating disk portion 78 and the land 80. Fluid flowing along the pathway of arrow P can easily get around the left dissipating disk portion 90 because the left dissipating disk portion 90 is proximate to the left wide portion 92. As a result, there is a wide clearance between the left dissipating disk portion 90 and the left wide portion 92.

Figure 4:
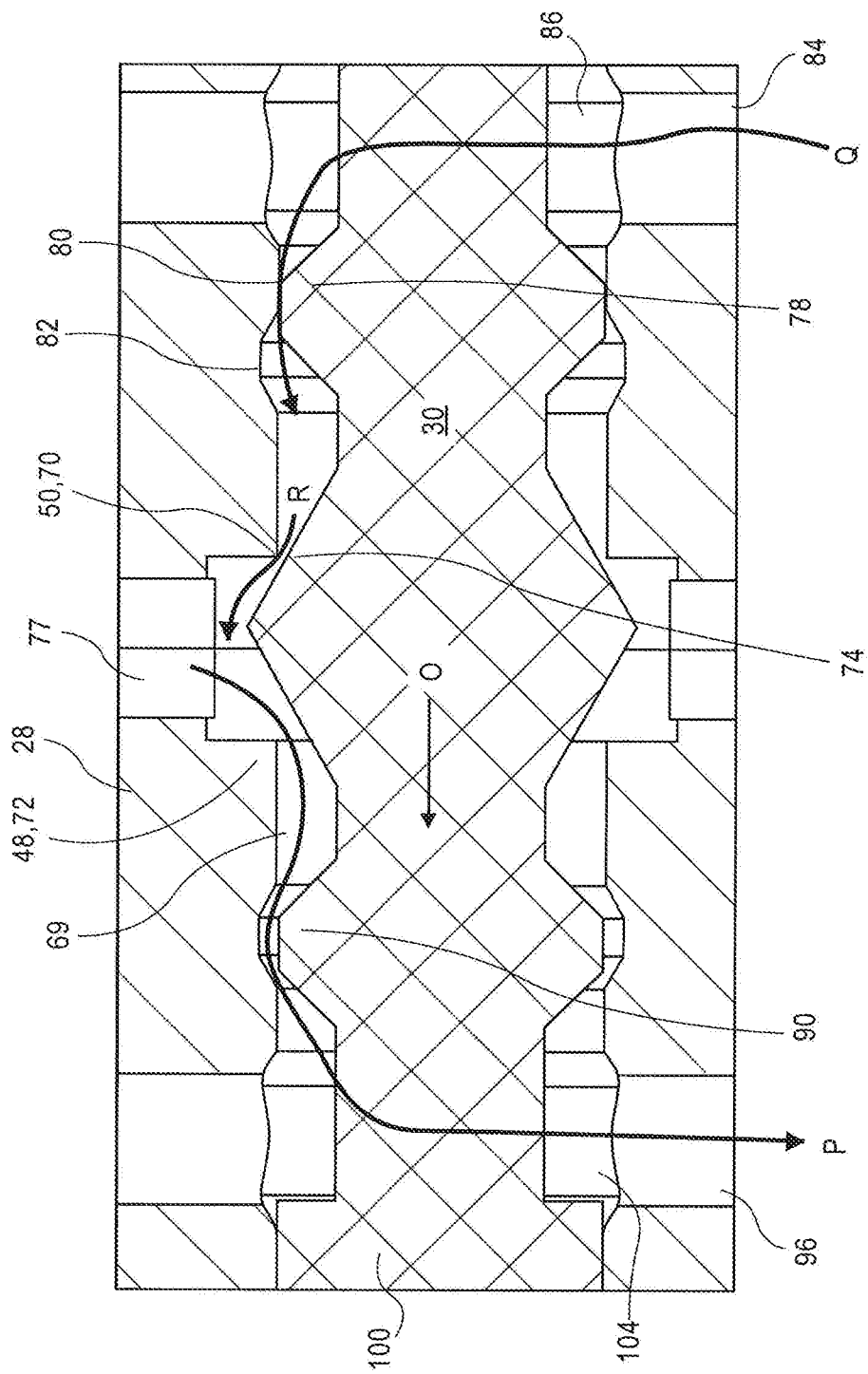
FIG. 4 is a partial cross-sectional view of one of the valves in the system with the spool in a particular position.

FIG. 4 illustrates the spool 30 moving slightly in the direction as indicated by arrow O. Here the spool 30 is in a transitional state at in that the right valve section 74 has moved slightly off of the valve seat 50, 70. As result, a little bit of fluid can flow as indicated by arrow R between the right valve section 74 and the valve seat 50, 70. In order for fluid flowing through port 84 as indicated by arrow Q it must slow down and dissipate energy in order to flow between the tight tolerance of the right dissipating disk portion 78 and the land 82. As result, any fluid flowing along the direction of arrow Q is sufficiently slowed down before reaches the valve seat 50, 70.

The fluid flowing along the direction indicated by arrow R has reduced velocity and dissipated energy due to the energy dissipation required when flowing between the right dissipating disk portion 78 and the right land 80 indicated by arrow Q. Even though the spool 30 has moved slightly to the left in the direction of arrow O, the left dissipating disk portion 90 is still proximate to the left wide portion 92 allowing fluid to flow easily by the left dissipating disk portion 90 through the left port portion 104 and out the left port 96 as indicated by arrow P.

Figure 5:
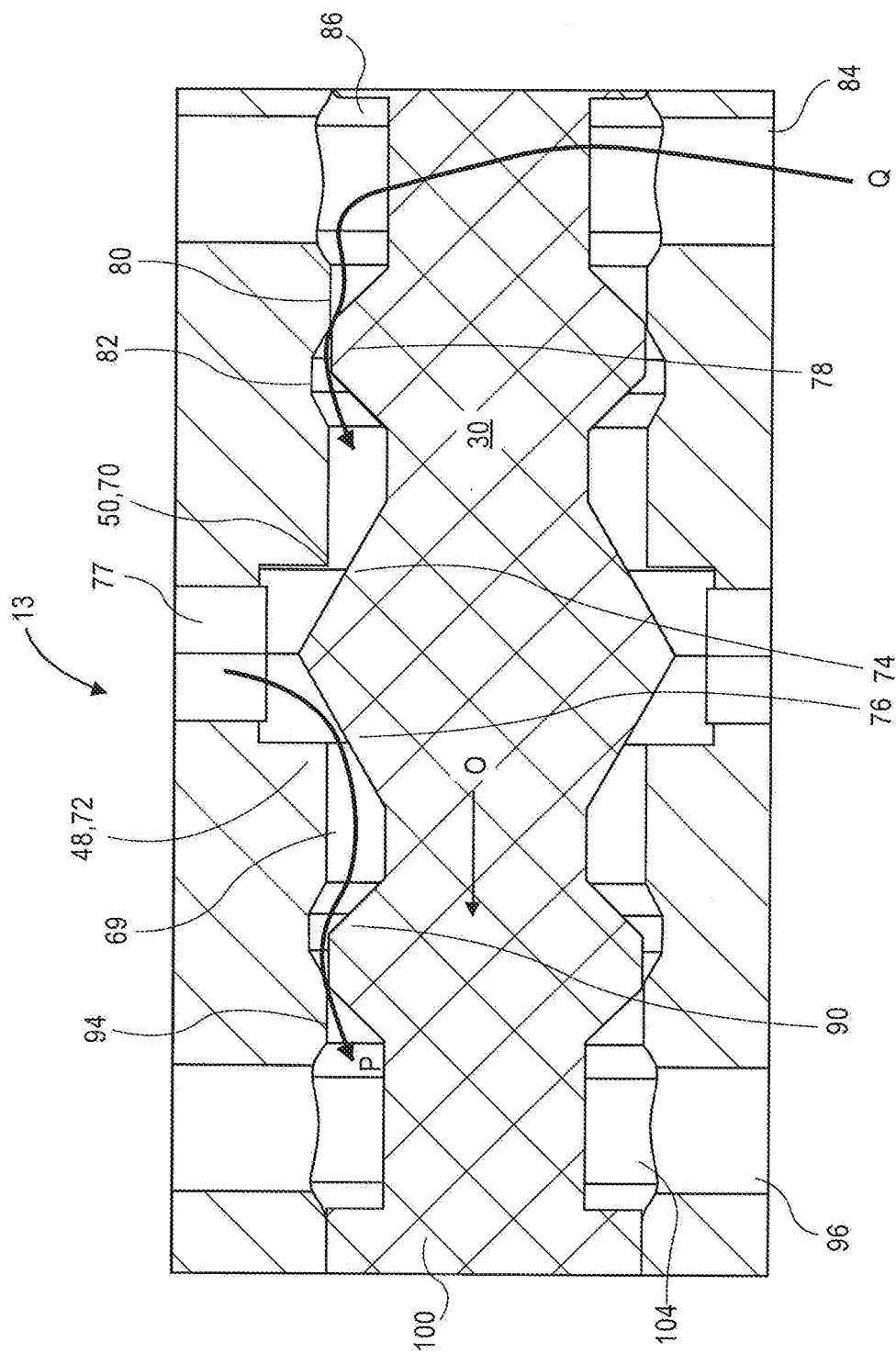
FIG. 5 a partial cross-sectional view of one of the valves in the system with the spool in a particular position.

FIG. 5 illustrates the valve 13 in a fully open position. The spool 30 has moved more to the left as indicated by arrow O and is not proximate to either the left valve seat 48, 72 or the right valve seat 50, 70. Fluid can flow through the top port 77 along the left valve section 78 through the cavity 69 and may slow a little bit as it moves around the left dissipating disk portion 90 and left land 94 as indicated by arrow P. However fluid may still flow through the left port portion 104 and through the left port 96. In addition, fluid may flow into the valve 13 through the right port 84 through the right port portion 86 and may slow little bit as it moves past the left dissipating disk portion 78 and the right land 80 as indicated by arrow Q.

Figure 6:
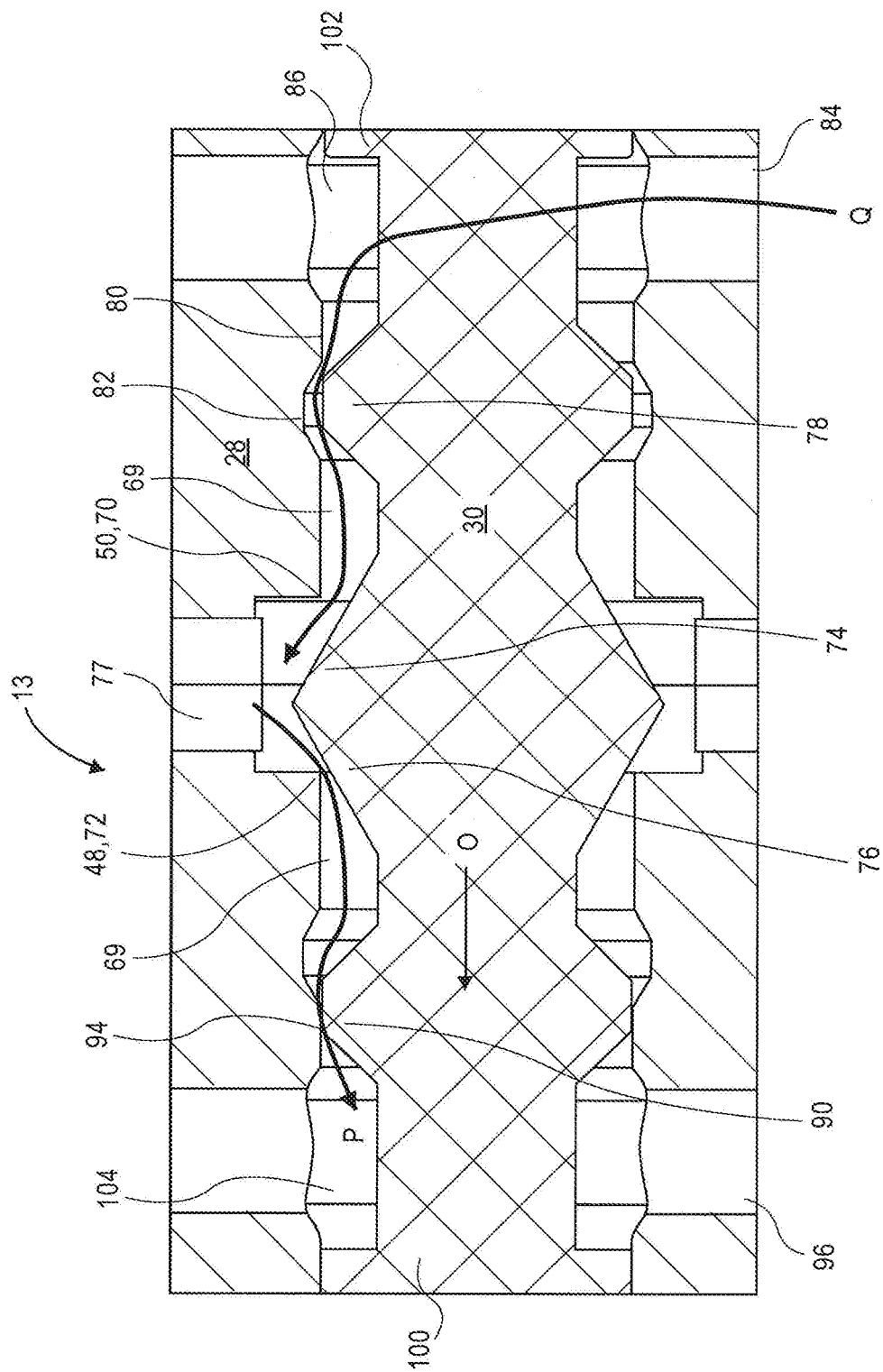
FIG. 6 is a partial cross-sectional view of one of the valves in the system with the spool in a particular position.

FIG. 6 shows the spool 30 continuing to move in the direction of arrow O. The valve 13 is again in a transitional state as it is closing but not quite closed with the left valve section 76 approaching the left valve seat 48, 72. Fluid flows easily into the valve 13 through the right port 84 through the right port portion 86 past the right land 80 and over the right dissipating disk portion 78. The right dissipating disk portion 78 is now proximate to the right wide portion 82 thereby providing ample clearance between the spool 30 and the valve housing 28.

Fluid may also flow through the top port 77 or may simply come in the direction along area Q and flow between the left valve section 76 and the left valve seat 48, 72. This flow flows through the cavity 69 along the spool 30 but is slowed as it encounters the tight tolerance between the left dissipating disk portion 90 and the left land 94 as indicated by arrow P. The fluid, after passing between the left dissipating disk portion 90 and the left land 94 may flow through the left port portion 104 and out the left port 96. One will note, that the left dissipating disk portion 90 is proximate to the left land 94.

In other embodiments, where the hydraulic system is configured in a different manner, if there were flow coming through the conduit 96 into the left port portion 104 it would be slowed by flowing through the tight tolerance between the left dissipating disk portion 90 and the left land 94.

FIG. 7 illustrates the valve 13 in a second closed position. The spool 30 has moved to the left in the direction indicated by arrow O. The left valve section 76 is seated against the left valve seat 48, 72. Thus, fluid flowing along the pathway defined by arrow Q or flowing into the valve 13 through the top port 77 as shown by arrow P is stopped at the valve seat 48, 72.

Arrow Q indicates a pathway through right port 84 along the port portion 86 past the right land 80 between the right dissipating disk portion 78 and the right wide portion 82 through the cavity 69. However there is no flow occurring even though this pathways open because the left valve section 76 is seated against the valve seat 48, 72. Due to the left valve portion 76 seated against left valve seat 48, 72 no fluid flows past the left wide portion 92 between the left land 94 and the left dissipating disk portion 90 through the left port portion 104 and out the left port 94.

One of ordinary skill the art after reviewing this disclosure will understand that different dimensions and locations of the various lands 80 and 94 and dissipating disk portions 78 and 90 may be used to slow hydraulic fluid flow at desired locations. In some embodiments the clearance between the dissipating disk portions 78 and 90 and the respective lands 82 and 94 may be about 0.0001 and 0.0004 of an inch. Other tolerances may also be used.

The above-described system may be used in various hydraulic systems. Some systems in which it may be suited may be systems where hydraulic fluid is constantly selectively flowing enough flowing. For example a pump for a hydraulic torque wrench.

Although an example of the system is shown using double seat valves, it will be appreciated that other valves using single seats or valves using more than one seat can be used. In these embodiments, it may be useful for a dissipating structure such as a land and dissipating disk to be associated with each valve seat so that fluid can be slowed down and its energy dissipated prior to the fluid encountering the valve portion on the spool or the valve seat. Similar valves as shown and described herein can also be used in systems where fluid flows in multiple directions through the valve.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve comprising:
    an axially movable spool having a conical valve portion and dissipating disk portion;
    a valve housing defining a valve cavity in which the spool resides;
    a first port in the valve housing configured to provide fluid communication from outside the valve housing to the valve cavity;
    a second port in the valve housing configured to provide fluid communication from outside the valve housing to the valve cavity;
    a land defined by the housing to provide a small tolerance between the land and the disk portion when the spool is in a position to cause the disk portion to be proximate to the land;
    a wide portion in the housing to provide a large tolerance between the land and the disk portion when the spool is in a position to cause the disk portion to be proximate to the wide portion; and
    a valve seat defined, at least in part, by the valve housing configured to form a seal with the conical valve portion when the spool is in a position to cause the conical valve portion to be pressed against the valve seat, and the disk portion, the land, the wide portion, the conical valve portion, and the valve seat are dimensioned to cause the disk portion and the land to be closer to each other but still define a passageway for fluid flow between the disk portion and the land when the valve portion is contacting the valve seat then when the valve portion is away from the valve seat.

2. The valve of claim 1, wherein a tolerance between the dissipating disk portion and the land when the disk portion and the land are in proximity to each other is about 0.0001 to 0.0004 of an inch.

3. The valve of claim 1, further comprising an end portion in the spool dimensioned to fill a diameter of the valve cavity so that fluid within the valve cavity is hindered from moving out of the valve cavity past the end portion.

4. The valve of claim 3, further comprising an O-ring groove and O-ring residing in the O-ring groove in the end portion to assist in sealing the cavity.

5. The valve of claim 3, wherein the first port is located in the valve housing between the end portion and the disk portion.

6. The valve of claim 1, wherein the second port is located in the valve housing located proximate to the valve seat.

7. The valve of claim 1, further comprising:
    a second conical valve portion;
    and a second dissipating disk portion residing on the spool;
    a second land defined by the housing configured to provide a small tolerance between the second land and the second disk portion when the spool is in a position to cause the second disk portion to be proximate to the second land and a second wide portion in the housing to provide a second large tolerance between the second land and the second disk portion when the spool is in a position to cause the second disk portion to be proximate to the second wide portion; and
    a second valve seat defined at least in part by the valve housing configured to form a seal with the second conical valve portion when the school is in a position to cause the second conical valve portion to be pressed against the second valve seat, wherein the second disk portion, the second land, the second wide portion, the second conical valve portion, and the second valve seat are dimensioned to cause the second disc portion and the second land to be proximate to each other when the second valve section is near the second valve seat and the second this portion is proximate to the second wide portion when the second valve, section is away from the second valve seat.

8. The valve of claim 7, wherein the first conical valve section spool is substantially a mirror image of the second conical valve section from an axis dividing the first and second conical valve sections.

9. The valve of claim 7, further comprising a second end portion in the spool dimensioned to fill a diameter of the valve cavity so that fluid within the valve cavity is hindered from moving out of the valve cavity past the second end portion.

10. The valve of claim 1, wherein the valve is configured to manipulate flow of high velocity hydraulic fluid.

11. The valve of claim 10, wherein the spool is dimensioned such that when the dissipating disk portion is a proximate to the land, velocity of the fluid flowing between the dissipating disk portion and the land slows down and loses kinetic energy.

12. The valve of claim 1, wherein the valve resides in a valve block along with a second valve and the valve and the second valve are in fluid communication with each other.

13. A valve comprising:
- an axially movable valving means having a conical valve portion and dissipating disk portion;
- a means for housing defining a valve cavity in which the valving means resides;
- a first port in the housing means configured to provide fluid communication from outside the housing means to the valve cavity;
- a second port in the housing means configured to provide fluid communication from outside the housing means to the valve cavity;
- a means for constricting defined by the housing means to provide a small tolerance between the means for constricting and the disk portion when the valving means is in a position to cause the disk portion to be proximate to the means for constricting;
- a wide portion in the housing to provide a large tolerance between the means for constricting and the disk portion when the valving means is in a position to cause the disk portion to be proximate to the wide portion; and
- a valve seat defined, at least in part, by the means for housing configured to form a seal with the conical valve portion when the valving means is in a position to cause the conical valve portion to be pressed against the valve seat and the disk portion, the means for constricting, the wide portion, the conical valve portion, and the valve seat are dimensioned to cause the disk portion and the means for constricting to be closer to each other but still define a flow passageway between the disk portion and the means for constricting when the valve section is contacting the valve seat than when the valve section is away from the valve seat.

* * * * *